United States Patent
Ho et al.

(10) Patent No.: US 9,515,530 B2
(45) Date of Patent: Dec. 6, 2016

(54) STATOR MODULE AND MAGNETIC FIELD GENERATING STRUCTURE THEREOF

(71) Applicant: INDUSTRIAL TECHNOLOGY RESEARCH INSTITUTE, Hsinchu (TW)

(72) Inventors: Se-Kang Ho, Hsinchu (TW); Kuo-Lin Chiu, Kaohsiung (TW); Chia-Min Ting, Bade (TW); Cheng-Min Chang, Keelung (TW); Chen-Chih Lin, Hsinchu County (TW); Hsien-Chang Huang, Tainan (TW); Yu-Hsun Wu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 660 days.

(21) Appl. No.: 13/846,124

(22) Filed: Mar. 18, 2013

(65) Prior Publication Data
US 2014/0139057 A1 May 22, 2014

(30) Foreign Application Priority Data

Nov. 21, 2012 (TW) .............................. 101143580 A

(51) Int. Cl.
H02K 3/22 (2006.01)
H02K 1/14 (2006.01)
H02K 3/52 (2006.01)
H02K 3/24 (2006.01)
H02K 9/00 (2006.01)
H02K 9/19 (2006.01)

(52) U.S. Cl.
CPC ................ *H02K 3/22* (2013.01); *H02K 1/148* (2013.01); *H02K 3/522* (2013.01); *H02K 3/24* (2013.01); *H02K 9/00* (2013.01); *H02K 9/19* (2013.01); *H02K 2203/09* (2013.01)

(58) Field of Classification Search
CPC ............ H02K 3/00; H02K 3/22; H02K 3/24; H02K 9/00; H02K 9/22
USPC ............................... 310/54; 174/98; 335/300
See application file for complete search history.

(56) References Cited

U.S. PATENT DOCUMENTS 2,433,660 A * 12/1947 Granfield ............... 310/216.086
2,897,382 A *  7/1959 Hamill ............................ 310/64
3,014,139 A * 12/1961 Shildneck ....................... 310/64
(Continued)

FOREIGN PATENT DOCUMENTS

CN      102005833 A    4/2011
CN      201821245 U    5/2011
(Continued)

OTHER PUBLICATIONS

China Patent Office, Office Action issued on Nov. 4, 2015.
(Continued)

*Primary Examiner* — Burton Mullins
(74) *Attorney, Agent, or Firm* — Rabin & Berdo, P.C.

(57) ABSTRACT

The disclosure provides a stator module and a magnetic field generating structure which includes a magnetizer and an electrically conducting pipe. The electrically conducting pipe is wound around the magnetizer and has a passage inside. The passage has an outlet and an inlet opposite to each other. The electrically conducting pipe has a current input portion and a current output portion.

12 Claims, 4 Drawing Sheets

(56) References Cited

U.S. PATENT DOCUMENTS

| | | | | |
|---|---|---|---|---|
| 3,052,746 | A | * | 9/1962 | Wolff .................. 174/8 |
| 3,652,882 | A | * | 3/1972 | Elliott .................. 310/61 |
| 3,681,628 | A | * | 8/1972 | Krastchew .................. 310/54 |
| 3,753,013 | A | * | 8/1973 | Beermann .......... H02K 9/005 310/198 |
| 3,753,015 | A | * | 8/1973 | Konovalov et al. .......... 310/64 |
| 4,229,671 | A | * | 10/1980 | Lesokhin .................. H02K 3/22 310/198 |
| 4,241,269 | A | * | 12/1980 | Antonov et al. ............ 310/61 |
| 4,298,812 | A | | 11/1981 | Damiron et al. |
| 4,322,645 | A | | 3/1982 | Spirk et al. |
| 4,360,750 | A | * | 11/1982 | Pohl .................. 310/54 |
| 4,862,024 | A | | 8/1989 | Stingle et al. |
| 5,489,810 | A | * | 2/1996 | Ferreira et al. .............. 310/54 |
| 5,642,013 | A | | 6/1997 | Wavre |
| 5,808,387 | A | * | 9/1998 | Akachi et al. ............... 310/54 |
| 6,106,236 | A | | 8/2000 | Henoch et al. |
| 6,304,011 | B1 | * | 10/2001 | Pullen .................. H02K 1/20 310/52 |
| 6,339,269 | B1 | | 1/2002 | Hsiao |
| 6,946,755 | B2 | | 9/2005 | Tamai et al. |
| 7,545,060 | B2 | * | 6/2009 | Ward .................. H02K 3/24 310/260 |
| 7,737,584 | B2 | | 6/2010 | Muller et al. |
| 7,851,966 | B2 | | 12/2010 | Rippel |
| 8,049,378 | B2 | | 11/2011 | Hattori et al. |
| 2008/0023177 | A1 | | 1/2008 | Hassett et al. |
| 2008/0252157 | A1 | | 10/2008 | Muller et al. |
| 2010/0252643 | A1 | * | 10/2010 | Hug .................. H02K 9/19 236/93 R |
| 2012/0025638 | A1 | * | 2/2012 | Palafox .................. H02K 3/24 310/52 |

FOREIGN PATENT DOCUMENTS

| | | | | |
|---|---|---|---|---|
| DE | 1026409 | * | 3/1958 | ............ H02K 3/22 |
| EP | 1852956 | * | 11/2007 | ............ H02K 3/22 |
| FR | 0987296 | * | 8/1951 | ............ H02K 3/22 |
| FR | 1363968 | * | 6/1964 | ............ H02K 3/22 |
| GB | 881908 | * | 11/1961 | ............ H02K 3/22 |
| GB | 1179553 | * | 1/1970 | ............ H02K 3/22 |
| JP | 60-257731 | * | 12/1985 | ............ H02K 3/22 |
| TW | 553335 U | | 9/2003 | |
| TW | 200826416 A | | 6/2008 | |
| TW | 200833456 A | | 8/2008 | |
| TW | 201105013 A | | 2/2011 | |
| TW | I366327 | | 6/2012 | |
| TW | 201240283 A | | 10/2012 | |
| WO | 0001053 | * | 1/2000 | ............ H02K 3/24 |

OTHER PUBLICATIONS

Jungreuthmayer et al., "A Detailed Heat and Fluid Flow Analysis of an Internal Permanent Magnet Synchronous Machine by Means of Computational Fluid Dynamics", IEEE Transactions on Industrial Electronics, Vol. 59, No. 12, pp. 4568-4578, Dec. 2012.

Festa et al., "Advances in Power Density and Efficiency—Circumferentially vs. Conventionally Cooled Electric Motors", Electrical Machines and Systems (ICEMS), 2010 International Conference on, pp. 1307-1312, Oct. 10-13, 2010.

Kulkarni et al., "Experimental Investigation of Contact Resistance for Water Cooled Jacket for Electric Motors and Generators", IEEE Transactions on Energy Conversion, Vol. 27, No. 1, pp. 204-210, Mar. 2012.

Ye et al., "Simulative Analysis of Traction Motor Cooling System Based on CFD", Electric Information and Control Engineering, pp. 746-749, 2011.

Stadler et al., "The Calculation of Eddy Current Losses in Tube Wound High Current Transformer Windings", 14th International Power Electronics and Motion Control Conference, pp. T12-1 to T12-5, 2010.

Tong et al., "Water Cooling System Design and Thermal Analysis for Low Speed Permanent Magnet Machines", Electrical Machines and Systems, pp. 1-4, 2011.

\* cited by examiner

STATOR MODULE AND MAGNETIC FIELD GENERATING STRUCTURE THEREOF

CROSS-REFERENCE TO RELATED APPLICATIONS

This non-provisional application claims priority under 35 U.S.C. §119(a) on Patent Application No(s). 101143580 filed in Taiwan, R.O.C. on Nov. 21, 2012, the entire contents of which are hereby incorporated by reference.

TECHNICAL FIELD

The disclosure relates to a stator module and a magnetic field generating structure thereof.

BACKGROUND

With the development of technologies, a servo motor plays an important role in both the conventional industries and the high-end technology industries. It is also an inevitable trend to fabricate the servo motor with a smaller volume, greater power and a lower cost. Currently, a high torque servo motor is more and more widely applied in a processing apparatus, and thus the demands for the high torque servo motor are increased. The most outstanding advantage of the high torque servo motor is that it does not need a decelerator to increase the torque output, thereby saving the cost of disposing the decelerator and reducing the volume of the apparatus.

The output torque of the motor is closely associated with the input current, and larger current needs to be input in order to output a higher torque. However, when large current is input into the motor, the heat dissipation problem needs to be considered. When the input current is increased, the heat generated by the motor winding is also increased accordingly, and thus the temperature of the motor is significantly increased. If the motor is installed on the processing apparatus, the temperature of the motor may affect the workpiece and cause thermal deformation of the workpiece. Therefore, a heat dissipation system is further added to the motor system and is adapted for controlling the temperature of the motor.

Currently, the heat dissipation system adopted by the servo motor is an externally connected cooling water passage, and the heat, generated by the motor, is removed by a cooling fluid in the cooling water passage. However, in the above heat dissipation manner, only after the temperature inside the motor rises, the heat generated by the motor is transferred to the cooling water passage through the thermal conduction, of the material, of the motor, and is then dissipated by the cooling fluid. Furthermore, in the current heat dissipation manner, the cooling fluid can only dissipate a large amount of heat after a temperature difference between the motor and the cooling water passage reaches a certain level. Therefore, if the temperature inside the motor rises dramatically, the cooling water passage cannot dissipate the heat, through heat transfer, in time, so that the temperature inside the motor is rather high and exceeds what can be endured by the material of the motor, thus causing damages to the motor.

SUMMARY

An embodiment of the disclosure provides a magnetic field generating structure which comprises a magnetizer and an electrically conducting pipe. The electrically conducting pipe is wound around the magnetizer and has a passage inside. The passage has an outlet and an inlet opposite to each other. The electrically conducting pipe has a current input portion and a current output portion.

Another embodiment of the disclosure provides a stator module. The stator module comprises a magnetizer and a plurality of electrically conducting pipes. The magnetizer comprises a base and a plurality of teeth protruding from one side of the base. The plurality of electrically conducting pipes are respectively wound around the plurality of teeth. Each of the plurality of electrically conducting pipes has a passage inside. The passage has an outlet and an inlet. Each of the plurality of electrically conducting pipes has a current input portion and a current output portion.

Still another embodiment of the disclosure provides a stator module. The stator module comprises a magnetizer, a plurality of electrically conducting pipes, a cooling system and a power supply system. The magnetizer comprises a base and a plurality of teeth protruding from one side of the base. The plurality of electrically conducting pipes are respectively wound around the plurality of teeth. Each of the plurality of electrically conducting pipes has a passage inside. The passage has an outlet and an inlet. Each of the plurality of electrically conducting pipes includes a current input portion and a current output portion. The current input portion and the current output portion are respectively disposed at two opposite ends of each of the plurality of electrically conducting pipes. The cooling system is connected to the plurality of outlets and the plurality of inlets. The power supply system is electrically connected to the current input portions and the current output portions of the electrically conducting pipes.

BRIEF DESCRIPTION OF THE DRAWINGS

The disclosure will become more fully understood from the detailed description given herein below for illustration only, and thus does not limit the disclosure, and wherein.

DETAILED DESCRIPTION

Figure 1:
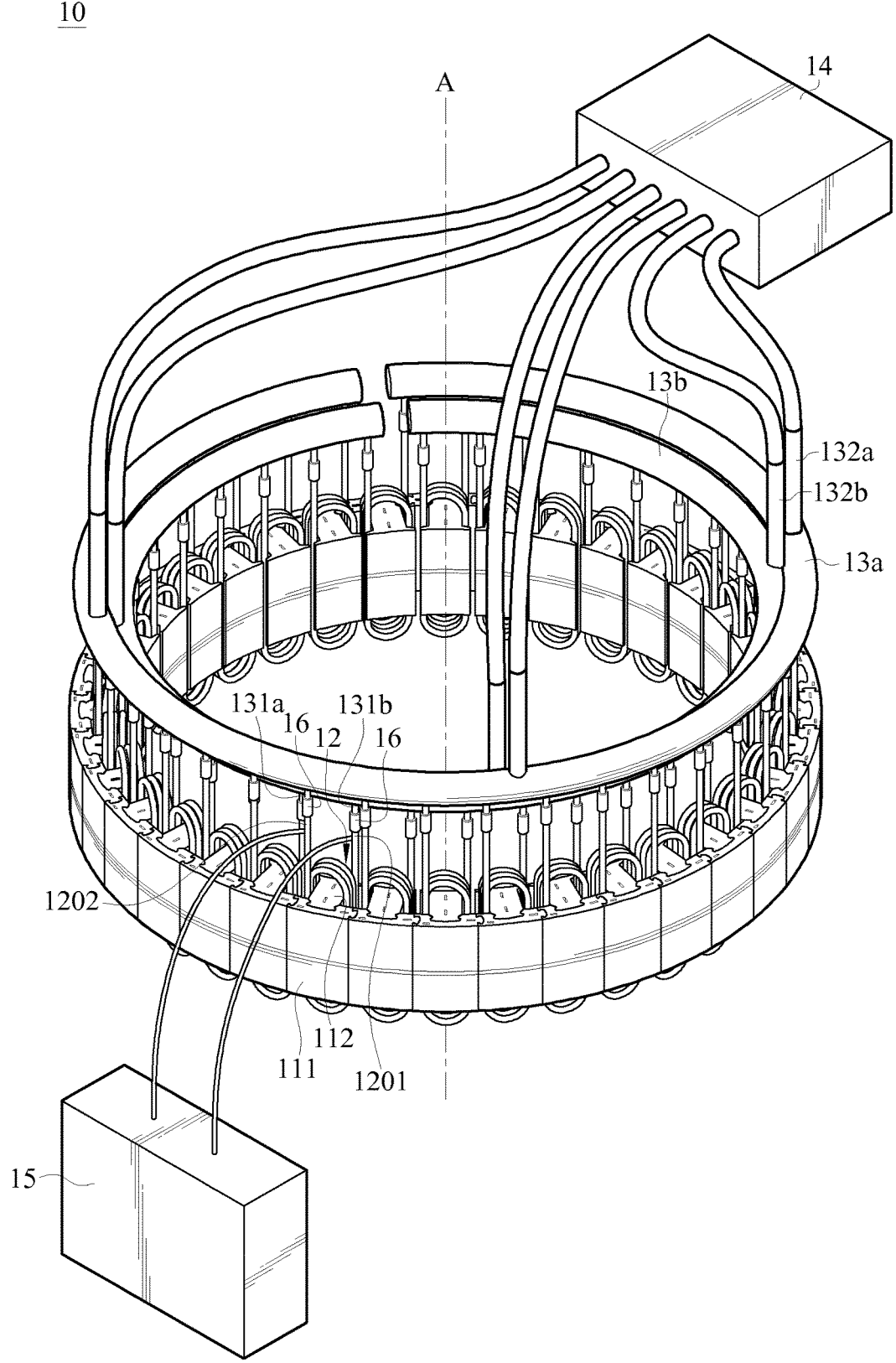
FIG. 1 is a schematic perspective view of a stator module according to an embodiment of the disclosure.
Figure 2:
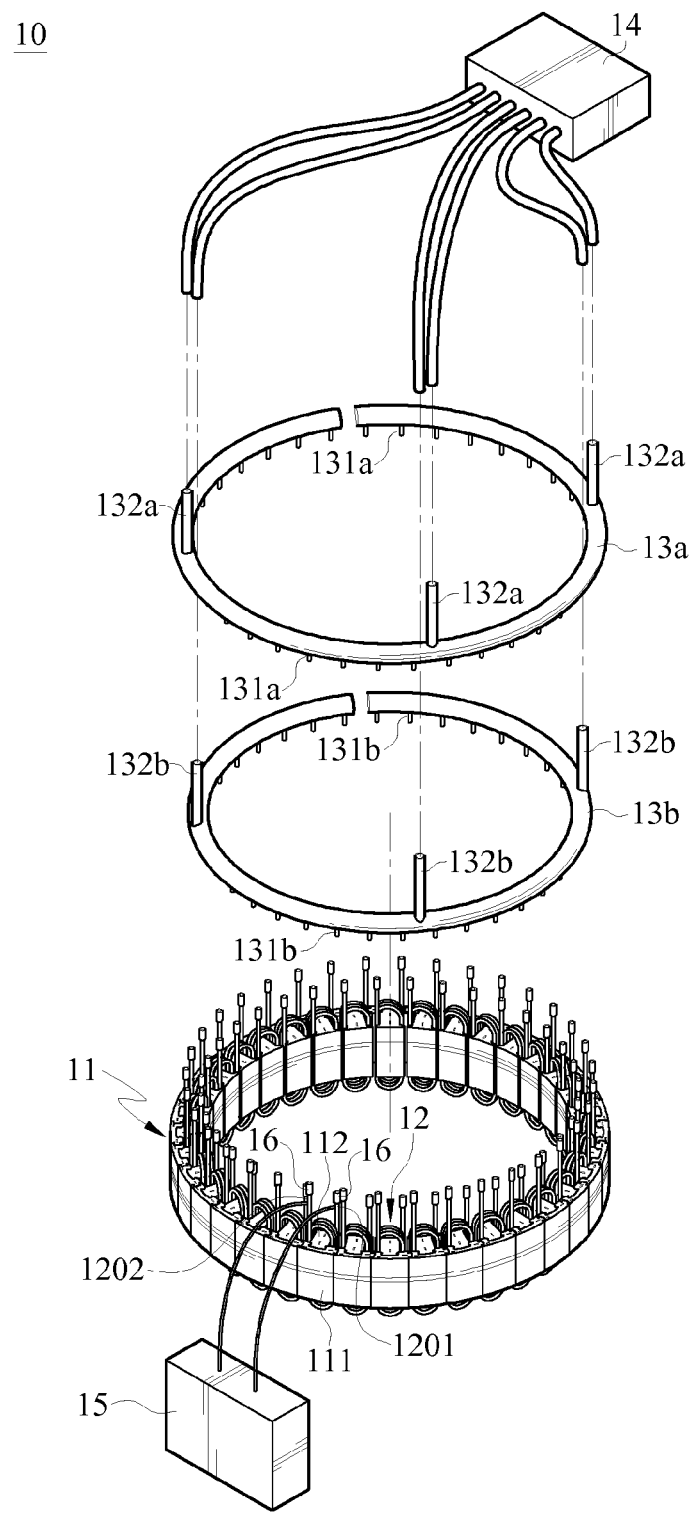
FIG. 2 is a schematic exploded view of the stator module according to an embodiment of the disclosure.
Figure 3:
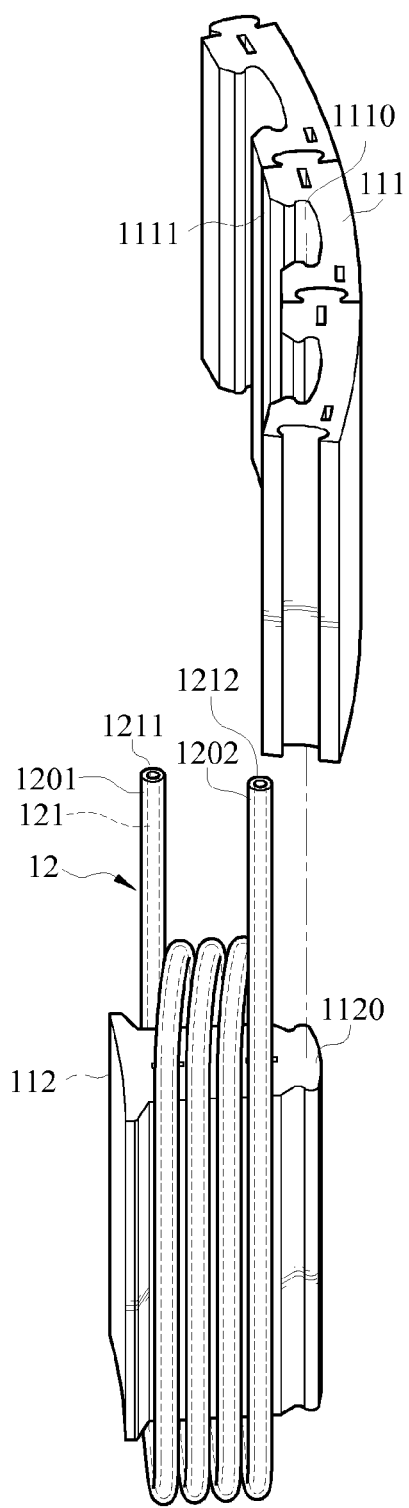
FIG. 3 is a schematic exploded view of a single magnetic field generating structure of the stator module according to an embodiment of the disclosure.

Please refer to FIGS. 1 to 3, FIG. 1 is a schematic perspective view of a stator module according to an embodiment of the disclosure, FIG. 2 is a schematic exploded view of the stator module according to an embodiment of the disclosure, and FIG. 3 is a schematic structural view of a single magnetic field generating structure of the stator module according to an embodiment of the disclosure.

The stator module 10 having a cooling function of the disclosure is, for example, applicable to a servo motor. The stator module 10 comprises a magnetizer 11, a plurality of electrically conducting pipes 12, two fluid pipelines 13a and 13b, a cooling system 14 and a power supply system 15.

The magnetizer 11 is, for example, made of a silicon steel material. The magnetizer 11 comprises a base 111 and a plurality of teeth 112 protruding from one side of the base 111. Typically, the base 111 is substantially annular, and has an annular inner surface 1111 inside. The plurality of teeth 112 protrude from the annular inner surface 1111, and are arranged annularly about a central axis A.

Furthermore, in this embodiment, the plurality of teeth 112 are detachably mounted on the base 111 in a combined manner. For example, each of the plurality of tooth 112 has a retaining block 1120, the base 111 has a plurality of retaining groove 1110. The plurality of retaining blocks 1120 of the plurality of teeth 112 are assembled to the plurality of retaining grooves 1110 of the base 111 to implement the combination. The disclosure is not limited to the above assembly manner. In this and some other embodiments, the base 111 is assembled by a plurality of base units through the above combined manner.

The electrically conducting pipes 12 are, for example, made of a copper material. The electrically conducting pipes 12 are respectively wound around the plurality of corresponding teeth 112. Typically, one electrically conducting pipe 12 is wound around each of the plurality of teeth 112. Each of the plurality of electrically conducting pipes 12 is hollow and has a passage 121 inside. The passage 121 has an outlet 1212 and an inlet 1211 opposite to each other, and allows a cooling fluid to pass through, so that the cooling fluid enters and exits the corresponding electrically conducting pipe 12 through the outlet 1212 and the inlet 1211, so as to dissipate the heat from the plurality of electrically conducting pipes 12. Two opposite ends of each of the plurality of electrically conducting pipes 12 has a current input portion 1201 and a current output portion 1202, respectively. The current input portion 1201 and the current output portion 1202 are electrically connected to the power supply system 15. The power supply system 15 provides a current to enter and exit the electrically conducting pipe 12 through the current input portion 1201 and the current output portion 1202, so that the current flows along the electrically conducting pipe 12 to generate a magnetic field at the tooth 112. In this and some other embodiments, the combination of the single tooth 112 of the magnetizer 11 and the single electrically conducting pipe 12 is regarded as a base unit of the magnetic field generating structure of the stator module 10.

Take the single tooth 112 for example, since the tooth 112 is mounted on the base 111 in a combined manner, in this and some other embodiments, the electrically conducting pipe 12 is first wound around the tooth 112, and then the tooth 112 is mounted on the base 111, thereby facilitating the assembly of the stator module 10.

In this embodiment, in order to clearly demonstrate the characteristics of this embodiment, the power supply system 15 is only electrically connected to one of the plurality electrically conducting pipes 12 for simplicity of the drawings. However, in practice, the power supply system 15 is electrically connected to all the plurality of electrically conducting pipes 12, the plurality of electrically conducting pipes 12 are electrically connected to each other in parallel, or the plurality of electrically conducting pipes 12 are divided into a plurality of electrically conducting pipe groups which are electrically connected to each other in parallel, and each of the plurality of electrically conducting pipe groups comprises the plurality of electrically conducting pipes 12 which are electrically connected to each other in series. Typically, the electrical connection modes (parallel connection and serial connection) between the plurality of electrically conducting pipes 12 are not limited in the disclosure and those skilled in the art may adjust the electrical connection modes according to actual requirements.

In this and some other embodiments, the electrically conducting pipe 12 is wound around the tooth 112 for one or more times. In this embodiment, the electrically conducting pipe 12 is, for example, wound around the tooth 112 for four times. Those skilled in the art can flexibly adjust the number of times the electrically conducting pipe 12 is wound around the tooth 112, according to the required intensity of the magnetic field.

In this and some other embodiments, the two fluid pipelines 13a and 13b are annular. The fluid pipeline 13a has a plurality of branch pipelines 131a and three connection pipelines 132a. The other fluid pipeline 131b has a plurality of branch pipelines 131b and three connection pipelines 132b. The plurality of branch pipelines 131a of the fluid pipeline 13a are connected to the outlet 1212 of each of the plurality of electrically conducting pipes 12, and the plurality of branch pipelines 131b of the fluid pipeline 13b are connected to the inlet 1211 of each of the plurality of electrically conducting pipes 12. Both the plurality of connection pipelines 132a of the fluid pipeline 13a and the plurality of connection pipelines 132b of the fluid pipeline 13b are connected to the cooling system 14, and the cooling system 14 provides the cooling fluid, so that the cooling fluid flows into the passage 121 of each of the plurality of electrically conducting pipes 12, through the fluid pipeline 13b, in order to absorb heat. Then, the cooling fluid flows out of the passage 121, in each of the plurality of electrically conducting pipes 12, into the fluid pipeline 13a for gathering, and flows back to the cooling system 14. Therefore, a single cooling circulation is complete.

Typically, the plurality of passages 121 in the plurality of electrically conducting pipes 12 become water passages, connected in parallel, through the fluid pipelines 13a and 13b. Therefore, it is ensured that the cooling fluid flowing through any electrically conducting pipe 12 directly flows back to the cooling system 14 for cooling, which prevents the cooling fluid before being cooled from flowing into the other electrically conducting pipes 12 anew to cause an undesirable heat dissipation effect.

In this embodiment, the one fluid pipeline 13a and the one fluid pipeline 13b are provided as an example for description, and the single fluid pipeline 13a and the single fluid pipeline 13b are disposed to simplify the design of the water passages, but the number of the fluid pipelines is not limited to the disclosure. For example, in other embodiments, the stator module 10 comprises a plurality of fluid pipelines 13a and a plurality of fluid pipelines 13b, the plurality of fluid pipelines 13a are uniformly distributed and connected to the outlets 1212, and the plurality of fluid pipelines 13b are uniformly distributed and connected to the inlets 1211. The above design can still achieve the efficacy of the disclosure.

To ensure the assembly of the stator module 10, in this and some other embodiments, the stator module 10 further comprises a plurality of insulating pipes 16. Each of the plurality of insulating pipes 16 is connected between one of the two fluid pipelines 13a and 13b as well as one of the plurality of electrically conducting pipes 12. Furthermore, the outlet 1212 and the inlet 1211 of each of the plurality of electrically conducting pipes 12 are respectively connected to the branch pipeline 131a of the fluid pipeline 13a and the branch pipeline 131b of the fluid pipeline 13b through the insulating pipe 16. Therefore, the electrically conducting pipe 12 is electrically insulated from the fluid pipelines 13a and 13b, so as to prevent the current on the electrically conducting pipe 12 from being conducted to the two fluid pipelines 13a and 13b to cause leakage.

In this and some other embodiments, the cooling fluid provided by the cooling system 14 is a non-conducting fluid, for example, pure water, oil or air. Since the cooling fluid is nonconductor, the current on the electrically conducting pipe 12 is prevented from being conducted through the cooling fluid to the fluid pipelines 13a and 13b to cause leakage.

In other embodiments, when the selected cooling fluid is conducting, an insulating layer is coated on an inner surface of the passage 121, in order to prevent the current on the plurality of electrically conducting pipes 12 from being conducted to the cooling fluid to cause leakage.

In the stator module of this embodiment, a current is allowed to pass through the plurality of electrically conducting pipes 12 to generate a magnetic field, so that the plurality of electrically conducting pipes 12 can be taken as common motor coils. In addition, the plurality of electrically conducting pipes 12 are hollow and allow the cooling fluid to pass through, so that the heat generated by the current when passing through the plurality of electrically conducting pipes 12 can be removed in time. Therefore, the heat dissipation efficiency of the stator module 10 is improved.

Figure 4:
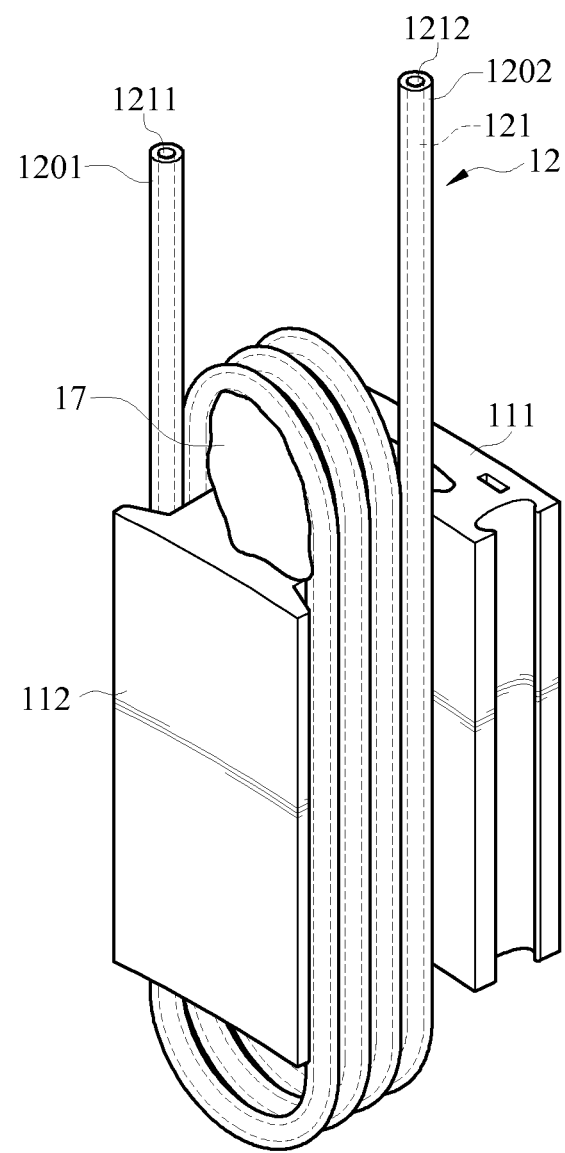
FIG. 4 is a schematic structural view of a single magnetic field generating structure of a stator module according to another embodiment of the disclosure.

Please refer to FIG. 4, which is a schematic structural view of a single magnetic field generating structure of a stator module according to another embodiment of the disclosure.

This embodiment is similar to that in FIG. 3, and merely the differences are described hereinafter. In this and some other embodiments, a thermal conductive adhesive 17 is disposed between the tooth 112 and the electrically conducting pipe 12. The thermal conductive adhesive 17 is adhered to and is in thermal contact with the tooth 112 and the electrically conducting pipe 12, so as to tightly fix the electrically conducting pipe 12 to the tooth 112, thereby improving the thermal conduction effect between the tooth 112 and the electrically conducting pipe 12 as well as enhancing the overall heat dissipation efficiency of the stator module 10.

According to the stator module having the cooling function and the magnetic field generating structure thereof provided by the above embodiments of the disclosure, the electrically conducting pipe is hollow, so that a current is allowed to pass through the electrically conducting pipe to generate a magnetic field, and a cooling fluid is also allowed to pass through the electrically conducting pipe to remove the heat caused by the current in time. Therefore, the overall heat dissipation efficiency of the stator module and the magnetic field generating structure thereof are improved.

What is claimed is:

1. A stator module comprising:
a magnetizer comprising a base and a plurality of teeth protruding from one side of the base;
a plurality of electrically conducting pipes respectively circumferentially wound around each of the plurality of teeth, each having a passage inside, the passage having an outlet and an inlet, and each of the plurality of electrically conducting pipes having a current input portion and a current output portion,
a first fluid pipeline having a plurality of first branch pipelines and a plurality of first connection pipelines, the plurality of first branch pipelines being connected to the respective outlets;
a second fluid pipeline having a plurality of second branch pipelines and a plurality of second connection pipelines, the plurality of second branch pipelines being connected to the respective inlets; and
each of the plurality of first connection pipelines and the plurality of second connection pipelines being configured to be connected to a cooling system.

2. The stator module according to claim 1, further comprising a plurality of insulating pipes, each of the plurality of insulating pipes being connected between one of the first branch pipelines and second branch pipelines and one of the electrically conducting pipes.

3. The stator module according to claim 1, further comprising a cooling system connected to the two fluid pipelines.

4. The stator module according to claim 1, further comprising a power supply system electrically connected to the plurality of current input portions and the plurality of current output portions of the electrically conducting pipes.

5. The stator module according to claim 1, further comprising a thermal conductive adhesive in thermal contact with the plurality of teeth and the plurality of electrically conducting pipes.

6. The stator module according to claim 1, wherein the plurality of teeth are detachably mounted on the base.

7. The stator module according to claim 1, wherein the base has an annular inner surface, and the plurality of teeth protrude from the annular inner surface.

8. A stator module, comprising:
a magnetizer comprising a base and a plurality of teeth protruding from one side of the base;
a plurality of electrically conducting pipes respectively circumferentially wound around each of the plurality of teeth, each of the plurality of electrically conducting pipes having a passage inside, the passage having an outlet and an inlet, and each of the plurality of electrically conducting pipes including a current input portion and a current output portion respectively disposed at two opposite ends of each of the plurality of electrically conducting pipes;
a cooling system connected to the plurality of outlets and the plurality of inlets;
a power supply system electrically connected to the current input portions and the current output portions of the electrically conducting pipes,
a first fluid pipeline having a plurality of first branch pipelines and a plurality of first connection pipelines, the plurality of first branch pipelines being connected to the respective outlets, and the plurality of first connection pipelines being connected to the cooling system; and
a second fluid pipeline having a plurality of second branch pipelines and a plurality of second connection pipelines, the plurality of second branch pipelines being connected to the respective inlets, and the plurality of second connection pipelines being connected to the cooling system.

9. The stator module according to claim 8, further comprising a plurality of insulating pipes, and each of the plurality of insulating pipes being connected between one of the plurality of first branch pipelines and second branch pipelines fluid pipelines and one of the plurality of electrically conducting pipes.

10. The stator module according to claim 8, further comprising a thermal conductive adhesive in thermal contact with the plurality of teeth and the plurality of electrically conducting pipes windings.

11. The stator module according to claim 8, wherein the plurality of teeth are detachably mounted on the base.

12. The stator module according to claim 8, wherein the base has an annular inner surface and the plurality of teeth protrude from the annular inner surface.

\* \* \* \* \*